United States Patent [19]
Martin et al.

[11] 4,338,725
[45] Jul. 13, 1982

[54] PIPE FITTER'S QUICK SQUARE

[76] Inventors: Larry J. Martin, Rte. 8, Box 417, Longview, Tex. 75601; John H. Gaddis, 618 Cynthia, Overton, Tex. 75684

[21] Appl. No.: 222,991

[22] Filed: Jan. 6, 1981

[51] Int. Cl.$^3$ ............................ G01B 3/14; G01B 5/24
[52] U.S. Cl. .................................. 33/174 N; 33/418; 33/482
[58] Field of Search ................ 33/412, 418, 422, 474, 33/424–426, 481, 482, 174 G, 174 N, 178 D, 403, 451

[56] References Cited

U.S. PATENT DOCUMENTS

| | | | |
|---|---|---|---|
| 657,443 | 9/1900 | Newton | 33/332 |
| 1,299,978 | 4/1919 | MacDowney . | |
| 1,610,193 | 12/1926 | Battle . | |
| 2,366,385 | 1/1945 | Comfort | 33/174 |
| 2,495,841 | 1/1950 | Fink | 33/426 |
| 2,658,672 | 11/1953 | Dalzell | 235/61 |
| 2,717,454 | 9/1955 | Sekki | 33/174 |
| 2,735,190 | 2/1956 | Jordan . | |
| 2,814,128 | 11/1957 | Hopkinson | 33/381 |
| 2,816,369 | 12/1917 | Becker . | |
| 2,899,750 | 8/1959 | Becroft . | |
| 2,990,622 | 7/1961 | Johnson . | |
| 3,245,201 | 4/1966 | Richardson | 33/180 R |
| 3,492,715 | 2/1970 | Maton | 29/407 |
| 3,670,418 | 6/1972 | Hamilton | 33/419 |

FOREIGN PATENT DOCUMENTS

| | | | |
|---|---|---|---|
| 17507 | of 1956 | Fed. Rep. of Germany | 33/474 |
| 424286 | of 1967 | Switzerland | 33/174 N |

*Primary Examiner*—Charles E. Phillips
*Attorney, Agent, or Firm*—Richards, Harris & Medlock

[57] ABSTRACT

A pipe fitter's square has a plurality of linear edges oriented at selected angles to provide easy and accurate alignment of pipe sections. A first edge of the square is parallel to its longitudinal axis. Second and third edges of the square are positioned at 45° angles to the first edge to provide for 90° pipe section alignment. Fourth and fifth edges of the square are positioned at 22.5° angles relative to the longitudinal axis of the square to allow alignment for a 45° bend. Levels are mounted to the square parallel and adjacent to the respective first, second and third edges to provide references to the horizontal and vertical and to make possible the division of pipe exteriors into equal angular sections. A protractor scale is imprinted on the square and a pivotal protractor arm is mounted on the square to measure specific angles.

12 Claims, 6 Drawing Figures

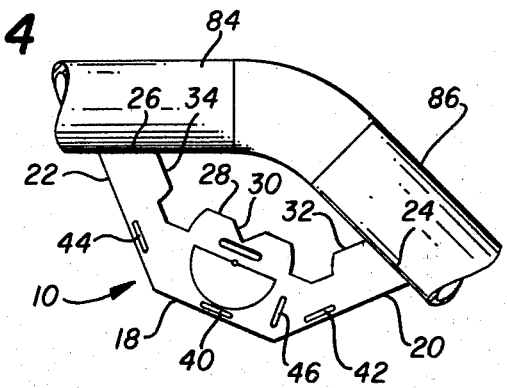
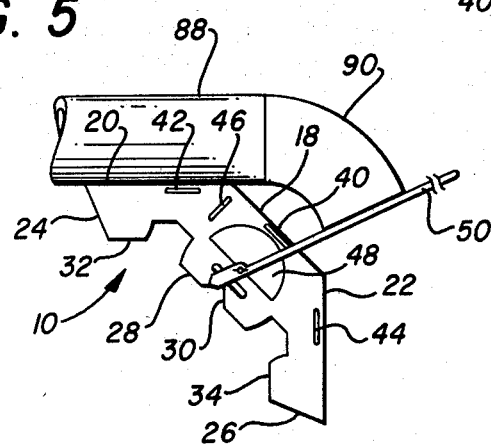
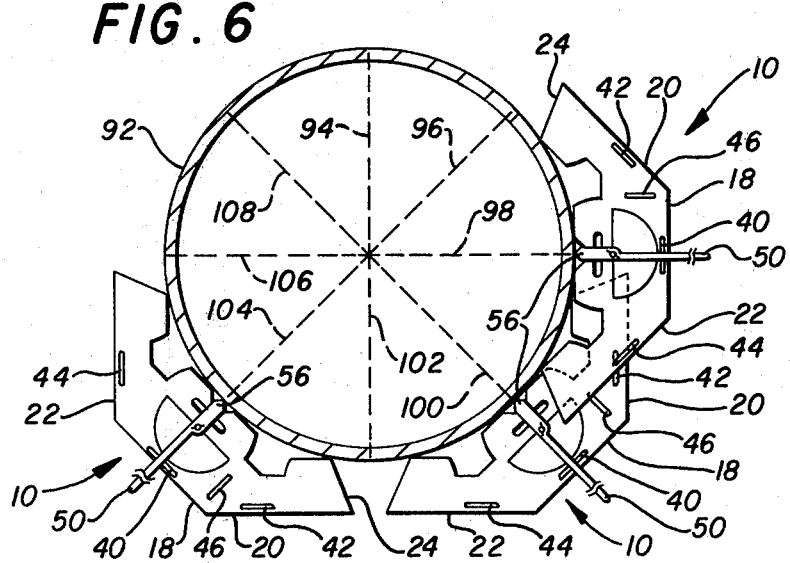

PIPE FITTER'S QUICK SQUARE

TECHNICAL FIELD

The present invention pertains to hand tools and more particularly to a multiple function square for use by pipe fitters.

BACKGROUND OF THE INVENTION

In pipe fitting work it is necessary to align pipes at various relative angles as well as to horizontal and perpendicular references. It is of course important that the pipe joint be accurately aligned but it is also important that the pipes be quickly and easily drawn into position. The most frequent requirements are for 45° and 90° bends. But there are also instances where odd angled joints must be fitted and accurate alignment be made between two pipes to be connected. There are also frequent requirements for the marking of pipes into even circumferential divisions, such as at 45° intervals aligned in reference with the horizontal or vertical.

In view of the need for specialized alignment in pipe fitting and the requirement that the alignment be accomplished very quickly and easily, there exists a need for a pipe fitter's square which can accomplish these multiple functions easily with a single tool.

SUMMARY OF THE INVENTION

A pipe fitter's square essentially comprises a planar member having first, second, third, fourth and fifth linear exterior edges. The first edge extends parallel to the longitudinal axis of the planar member. The second edge intersects a first end of the first edge at a 135° interior angle. The third edge intersects a second end of the first edge at a 135° interior angle and the third edge is essentially equal in length to the second edge. A fourth edge intersects the second edge at an end thereof opposite the first edge and the fourth edge has an interior angle of 67.5° with respect to the second edge. And, a fifth edge intersects the third edge at an end thereof opposite the first edge and the fifth edge has an interior angle of 67.5° with respect to the second edge. Further features of the invention include first, second and third vial levels mounted to the planar member respectively adjacent the first, second and third edges. A still further feature comprises a protractor scale imprinted on the center portion of the planar member and including a protractor arm for measuring angles on the protractor scale.

BRIEF DESCRIPTION OF THE DRAWINGS

For a more complete understanding of the present invention and advantages thereof, reference is now made to the following description taken in conjunction with the accompanying drawings in which:

FIG. 4 is an elevation view of the present invention used to align a 45° fitting in a run of pipe;

FIG. 5 is an elevation view of the present invention utilizing a protractor arm to measure a selected angle of pipe; and FIG. 6 is an elevation view of the present invention used to divide a section of pipe into eight even circumferential sections.

DETAILED DESCRIPTION OF THE INVENTION

Figure 1:
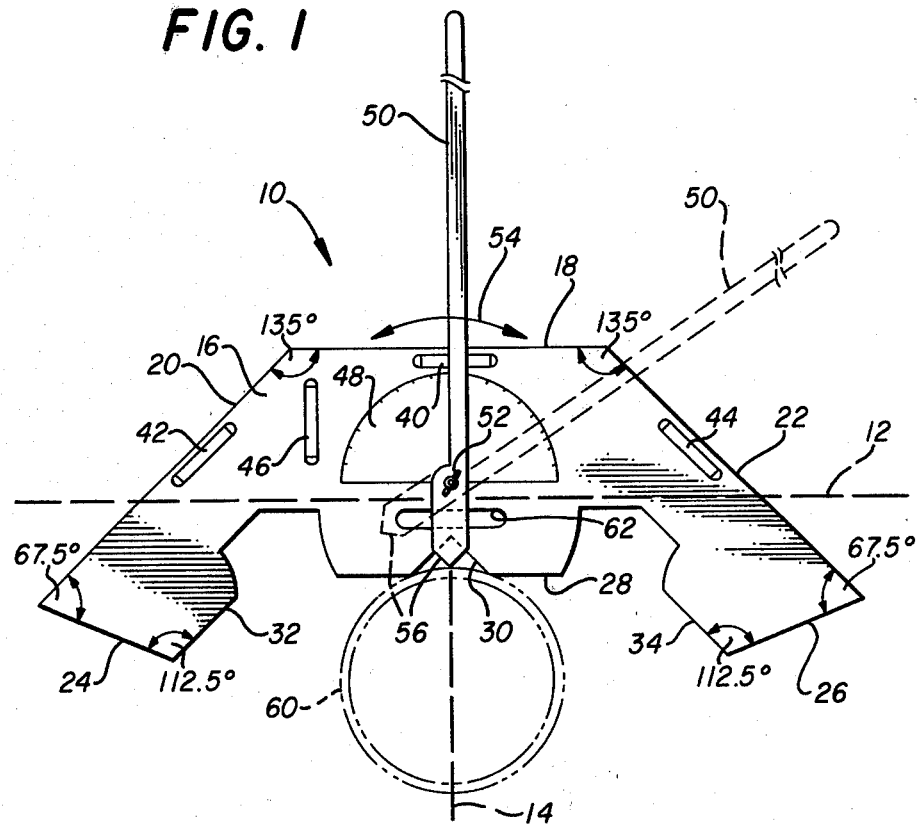
FIG. 1 is a plan view of the pipe fitter's square of the present invention shown in conjunction with a pipe section.

Referring to FIG. 1, the pipe fitter's quick square of the present invention is referred to generally by the reference numeral 10. The orientation of the square 10 is described in reference to a longitudinal line 12 and a central line 14. The square 10 basically comprises a body 16 which is a planar member.

The square 10 is provided with a plurality of straight edges which are fabricated with predetermined angles to provide alignment of pipe sections. Square 10 has a first edge 18 which is parallel to the longitudinal line 12. A second edge 20 intersects a first end of the edge 18 and has an interior angle of 135° with respect to edge 18. A third edge 22 is the mirror image of edge 20 about the center line 14 and intersects the edge 18 also at an interior angle of 135°.

A fourth edge 24 intersects the edge 20 at the end thereof opposite the edge 18. The interior angle between edge 24 and edge 20 is 67.5°. A fifth edge 26 is the mirror image of edge 24 about the center line 14. Edge 26 intersects edge 24 at an end thereof opposite the edge 18. The interior angle between edge 26 and edge 22 is 67.5°.

A sixth edge 28 is parallel to the longitudinal line 12 and the edge 18 and is spaced uniformly between the edges 20 and 22. The edge 28 is provided with a notch 30 which is cut inward toward the edge 18 and is uniformly spaced along the center line 14 of the square 10.

A seventh edge 32 intersects the edge 24 at the end thereof opposite the edge 20. The interior angle between edge 32 and edge 24 is 112.5°. An eighth edge 34 intersects edge 26 at the end thereof opposite the intersection of edge 22. The edge 34 has an interior angle of 112.5° with respect to edge 26.

The edges 20 and 22 have essentially the same length. The edges 24 and 26 have essentially the same length. Likewise, the edges 32 and 34 are fabricated to have essentially the same length.

The shape of the planar member 16 of square 10 is such that it provides rapid alignment for standard angles. Pipes placed parallel to sides 20 and 22 will be aligned to meet at an angle of 90°. Pipes placed parallel to sides 24 and 26 will be aligned at a bend angle of 45°.

To provide references to the horizontal and vertical the square 10 is provided with a plurality of vial levels. A level 40 is mounted to planar member 16 adjacent to edge 18 with the axis of the level parallel to the edge 18. A vial level 42 is mounted to the planar member 16 adjacent to edge 20 with the axis of the level parallel to the edge 20. A vial level 44 is mounted to the planar member 16 adjacent to the edge 22 with the axis of the level 44 parallel to the edge 22. A vial level 46 is mounted to the planar member 16 in the region thereof between the edges 18 and 20 and oriented with the axis of the level 46 perpendicular to the edge 18.

The square 10 is further provided with a protractor scale 48 to provide for alignment of pipes at other than 45°, 90° and 180°. The protractor scale 48 is imprinted on the planar body 16. A protractor arm 50 is pivotally and removably attached to the body 16 by means of a wing nut 52. Pivoting motion of the arm 50 is illustrated by the arrow 54. The arm 50 can be removed from the body 16 when it is not required for use. The lower end of the arm 50 is provided with a pointer 56 which extends into the notch 30 when the arm 50 is aligned perpendicularly to the edge 18.

The square 10 as shown in FIG. 1 is positioned on a pipe section 60 so that the top center point of the pipe can be marked. The level 40 is balanced and the pipe is marked at the tip of the pointer 56.

The planar body 16 is further provided with a hand hold opening 62 which makes it possible for the operator to securely grip the square 10 and hold it in position while marking and aligning pipe section.

Specific applications of the square 10 for the alignment and marking of pipe sections are illustrated in FIGS. 2–6.

Figure 2:
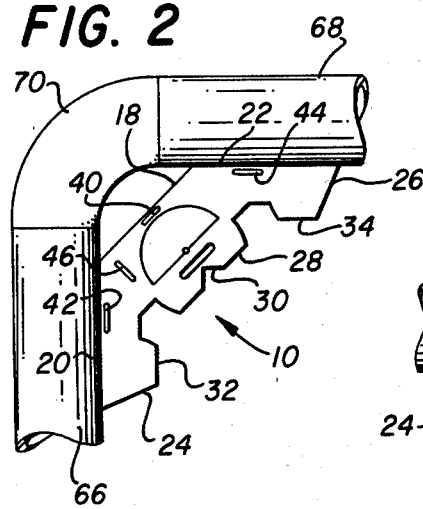
FIG. 2 is an elevation view of the present invention used to align a 90° fitting in a run of pipe.

Referring to FIG. 2 the square 10 is utilized to align pipe sections 66 and 68 for connection of a joint 70. The pipe section 66 is aligned with edge 20 and the pipe section 68 is aligned with the edge 22. The pipe section 66 can also be aligned horizontally by use of the level 44. This automatically aligns pipe sections 66 to the vertical.

Figure 3:
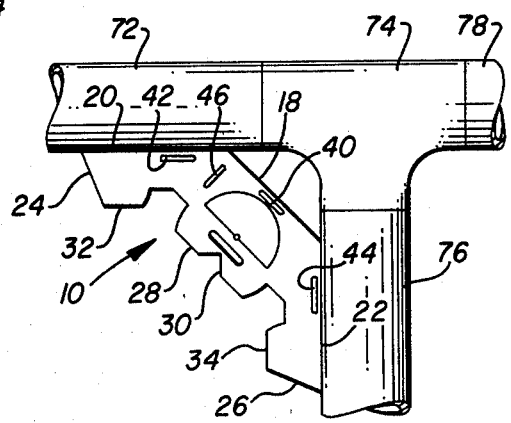
FIG. 3 is an elevation view of the present invention used to square a Tee fitting in a run of pipe.

In FIG. 3 the square 10 is utilized to align a pipe section 72 with a Tee 74 which has previously been connected to pipe sections 76 and 78. The square is positioned such that edge 22 is aligned parallel with pipe sections 76. The pipe section 72 is then aligned with edge 22 and it is therefore made perpendicular to the pipe section 76 and parallel to pipe section 78.

In FIG. 4 the square 10 is used to make a 45° bend. Pipe sections 84 and 86 are respectively aligned parallel with the edges 26 and 24.

Referring to FIG. 5 there is shown the measurement of an odd angle. A pipe section 88 is to be fitted to another pipe section which is at a selected angle. The selected angle is determined by setting the protractor 50 at the selected angle as shown on the protractor scale 48. The fitting 90 can then be marked to be cut at the selected angle.

In certain pipe fitting applications it is necessary to mark the exterior of a pipe into angular sections. Referring to FIG. 6 the pipe section 92 is to have the exterior marked into eight equal segments. The square 10 is moved around the pipe 92 to mark each of the points shown by the dashed lines 94–108. The square 10 is positioned on the right-hand side of the pipe section 92 and the level 46 is balanced to define the point shown by line 98. The square 10 is rotated clockwise until the level 44 is balanced to define the line 100. The level 40 is balanced to define line 102. This procedure is continued with the level 42 used to define line 104, level 46 for line 106, level 44 for line 108, level 40 for line 94 and level 42 for line 96. At each position the pipe is marked at the point indicated by the pointer 96.

In summary, the present invention is a pipe fitter's square which is shaped to have edge sections at common angles for the alignment of pipe sections. Vial levels are included at selected angles within the square to provide vertical and horizontal references and to make possible the selected angular division of a pipe section.

Although one embodiment of the invention has been illustrated in the accompanying drawings and described in the foregoing detailed description, it will be understood that the invention is not limited to the embodiment disclosed, but is capable of numerous rearrangements, modifications and substitutions without departing from the scope of the invention.

We claim:

1. A pipe fitter's square comprising:
  a planar member having first, second, third, fourth and fifth linear exterior edges;
  said first edge extending parallel to the longitudinal axis of said planar member;
  said second edge intersecting a first end of said first edge at a 135° interior angle;
  said third edge intersecting a second end of said first edge at a 135° interior angle, said third edge essentially equal in length to said second edge;
  said fourth edge intersecting said second edge at an end thereof opposite said first edge, said fourth edge having an interior angle of 67.5° with respect to said second edge; and
  said fifth edge intersecting said third edge at an end thereby opposite said first edge, said fifth edge having an interior angle of 67.5° with respect to said second edge whereby said second and third edges when engaged with two intersecting pipes will position them at 90° and when said fourth and fifth edges are engaged with intersecting pipes will position them at 45°.

2. The pipe fitter's square recited in claim 1 including:
  a first vial level mounted to said planar member with the axis of said first vial level parallel to said first edge;
  a second vial level mounted to said planar member with the axis of said second vial level parallel to said second edge; and
  a third vial level mounted to said planar member with the axis of said third vial level parallel to said third edge.

3. The pipe fitter's square recited in claim 1 including a fourth vial level mounted to said planar member with the axis of said fourth vial level perpendicular to said first edge.

4. The pipe fitter's square recited in claim 2 wherein said first vial level is adjacent said first edge, said second vial level is adjacent said second edge and said third vial level is adjacent said third edge.

5. The pipe fitter's square rented in claim 1 wherein said fourth edge is essentially equal in length to said fifth edge.

6. The pipe fitter's square recited in claim 1 including a sixth edge parallel to and opposite said first edge, said sixth edge including a notch located at the center line of said planar member.

7. The pipe fitter's square recited in claim 1 including a seventh edge intersecting said fourth edge at an end thereof opposite said second edge, said seventh edge having an interior angle of 112.5° with respect to said fourth edge and an eighth edge intersecting said fifth edge at an end thereof opposite said third edge, said eighth edge having an interior angle of 112.5° with respect to said fifth edge.

8. The pipe fitter's square recited in claim 7 wherein said seventh and said eighth edges have essentially equal lengths.

9. The pipe fitter's square recited in claim 1 including a protractor scale imprinted on the center portion of said planar member and a pivoting arm connected to said planar member for indicating angles on said protractor scale relative to the longitudinal axis of said planar member.

10. The pipe fitter's square recited in claim 9 including a pointer mounted to said pivoting arm and extending into said notch.

11. A pipe fitter's square comprising:

a planar member having first, second, third, fourth fifth, sixth, seventh and eighth linear exterior edges;

said first edge extending parallel to the longitudinal axis of said planar member;

said second edge intersecting a first edge at a 135° interior angle;

said third edge intersecting a second end of said first edge at a 135° interior angle, said third edge being essentially equal in length to said second edge;

said fourth edge intersecting said second edge at an end thereof opposite said first edge, said fourth edge having an interior angle of 67.5° with respect to said second edge, said fifth edge intersecting said third edge at an end thereof opposite said first edge, said fifth edge having an interior angle of 67.5° with respect to said second edge and said fifth edge essentially equal in length to said fourth edge;

a first vial level mounted to said planar member adjacent said first edge with the axis of said first vial level parallel to said first edge;

a second vial level mounted to said planar member with the axis of said second vial level parallel to said second edge, a third vial level mounted to said planar member adjacent said third edge with the axis of said third vial level parallel to said third edge;

a fourth vial level mounted to said planar member with the axis of said fourth vial level perpendicular to said first edge, a sixth edge parallel to and opposite said first edge, said sixth edge including a notch located at the center line of said planar member, a seventh edge intersecting said fourth edge at an end thereof opposite said second edge, said seventh edge having an interior angle of 112.5° with respect to said fourth edge; and an eighth edge intersecting said fifth edge at an end thereof opposite said third edge, said eighth edge having an interior angle of 112.5° with respect to said fifth edge, said seventh and said eighth edges having essentially equal lengths.

12. The pipe fitter's square recited in claim 11 including a protractor scale imprinted on the center portion of said planar member and a pivoting arm connected to said planar member for indicating angles on said protractor scale relative to the longitudinal axis of said planar member, said notch located at the center line of said planar member.

* * * * *